(12) United States Patent
Li et al.

(10) Patent No.: US 11,184,143 B2
(45) Date of Patent: Nov. 23, 2021

(54) METHOD AND APPARATUS FOR PROCESSING FLEXIBLE DUPLEX

(71) Applicant: Samsung Electronics Co., Ltd., Gyeonggi-do (KR)

(72) Inventors: Yingyang Li, Beijing (CN); Jingxing Fu, Beijing (CN); Shichang Zhang, Beijing (CN); Chengjun Sun, Beijing (CN)

(73) Assignee: Samsung Electronics Co., Ltd

( * ) Notice: Subject to any disclaimer, the term of this patent is extended or adjusted under 35 U.S.C. 154(b) by 160 days.

(21) Appl. No.: 15/304,686

(22) PCT Filed: Apr. 15, 2015

(86) PCT No.: PCT/KR2015/003782
§ 371 (c)(1),
(2) Date: Oct. 17, 2016

(87) PCT Pub. No.: WO2015/160184
PCT Pub. Date: Oct. 22, 2015

(65) Prior Publication Data
US 2017/0041122 A1    Feb. 9, 2017

(30) Foreign Application Priority Data

Apr. 17, 2014    (CN) .......................... 201410154276.5

(51) Int. Cl.
*H04L 5/14*    (2006.01)
*H04W 52/24*    (2009.01)
(Continued)

(52) U.S. Cl.
CPC .............. *H04L 5/14* (2013.01); *H04L 1/1812* (2013.01); *H04L 5/001* (2013.01); *H04L 5/0044* (2013.01);
(Continued)

(58) Field of Classification Search
CPC ......... H04L 5/14; H04L 1/1812; H04L 5/001; H04L 5/0044; H04L 5/0064;
(Continued)

(56) References Cited

U.S. PATENT DOCUMENTS

2008/0279125 A1    11/2008 Hottinen
2009/0196204 A1    8/2009 Astely et al.
(Continued)

FOREIGN PATENT DOCUMENTS

CN    101026386    8/2007
JP    2002-345014    11/2002
(Continued)

OTHER PUBLICATIONS

PCT/ISA/210 Search Report issued on PCT/KR2015/003782 (pp. 3).
(Continued)

*Primary Examiner* — Christopher M Crutchfield
*Assistant Examiner* — Tito Q Pham
(74) *Attorney, Agent, or Firm* — The Farrell Law Firm, P.C.

(57) ABSTRACT

The present invention provide a method for processing flexible duplex, including: receiving, by a UE, configuration information of flexible duplex; and according to the received configuration information of flexible duplex, transmitting and receiving data by the UE based on configured uplink and downlink subframe distribution on one or two carriers of a flexible duplex cell. The present disclosure further provides an apparatus for processing flexible duplex. The method and apparatus of the present disclosure support to configure uplink and downlink subframes at the same time on a pair of carriers or one of a pair of carriers of the flexible duplex cell, so as to meet requirements of uplink and downlink traffics.

18 Claims, 2 Drawing Sheets

```
┌─────────────────────────────────────────────┐
│  the UE receives configuration information  │─── 301
│       about the flexible duplex             │
└─────────────────────────────────────────────┘
                     │
                     ▼
┌──────────────────────────────────────────────────────┐
│ according to the received configuration information  │
│ of the flexible duplex, the UE transmits and receives│
│ data on one or two carriers of a flexible            │─── 302
│ duplex cell based on an uplink-downlink subframe     │
│ distribution in the configuration                    │
└──────────────────────────────────────────────────────┘
```

(51) Int. Cl.
*H04L 5/00* (2006.01)
*H04W 52/14* (2009.01)
*H04W 72/04* (2009.01)
*H04W 72/12* (2009.01)
*H04L 1/18* (2006.01)

(52) U.S. Cl.
CPC .......... *H04L 5/0064* (2013.01); *H04L 5/0092* (2013.01); *H04L 5/1469* (2013.01); *H04W 52/146* (2013.01); *H04W 52/242* (2013.01); *H04W 72/0446* (2013.01); *H04L 5/0055* (2013.01); *H04W 72/1289* (2013.01)

(58) Field of Classification Search
CPC ... H04L 5/0092; H04L 5/1469; H04L 5/0055; H04W 52/146; H04W 52/242; H04W 72/0446; H04W 72/1289
See application file for complete search history.

(56) References Cited

U.S. PATENT DOCUMENTS

| | | | |
|---|---|---|---|
| 2009/0296609 | A1 | 12/2009 | Choi et al. |
| 2010/0240400 | A1* | 9/2010 | Choi ............... H04W 68/02 455/458 |
| 2012/0063373 | A1 | 3/2012 | Chincholi et al. |
| 2012/0069793 | A1* | 3/2012 | Chung ............. H04W 76/27 370/315 |
| 2012/0207038 | A1* | 8/2012 | Choi ............... H04W 16/14 370/252 |
| 2012/0275322 | A1* | 11/2012 | Ji ................... H04L 1/0027 370/252 |
| 2013/0163485 | A1* | 6/2013 | Wan ............... H04W 72/0426 370/280 |
| 2013/0165115 | A1 | 6/2013 | Jung et al. |
| 2013/0235769 | A1 | 9/2013 | Yuan et al. |
| 2014/0003387 | A1 | 1/2014 | Lee et al. |
| 2014/0086112 | A1 | 3/2014 | Stern-Berkowitz et al. |
| 2014/0113576 | A1* | 4/2014 | Nentwig ............ H04B 1/525 455/84 |
| 2014/0153535 | A1* | 6/2014 | Lei .................. H04L 1/1861 370/329 |
| 2014/0204854 | A1* | 7/2014 | Freda ............... H04L 1/18 370/329 |
| 2015/0109932 | A1* | 4/2015 | Goldhamer ....... H04W 72/0453 370/236 |
| 2015/0304096 | A1* | 10/2015 | Sahlin ............... H04B 7/2615 370/280 |
| 2015/0358920 | A1* | 12/2015 | Sorrentino ......... H04W 52/146 455/522 |
| 2016/0081033 | A1* | 3/2016 | Ouchi .............. H04W 52/248 455/522 |
| 2017/0126340 | A1* | 5/2017 | Li .................. H04B 17/345 |

FOREIGN PATENT DOCUMENTS

| | | |
|---|---|---|
| JP | 2007-529934 | 10/2007 |
| JP | 2011-511596 | 4/2011 |
| JP | 2013-543671 | 12/2013 |
| JP | 2015-515775 | 5/2015 |
| JP | 2016-500940 | 1/2016 |
| WO | WO 2012/174213 | 12/2012 |
| WO | WO 2013125871 | 8/2013 |
| WO | WO 2013/134462 | 9/2013 |
| WO | WO 2014/052645 | 4/2014 |

OTHER PUBLICATIONS

PCT/ISA/237 Written Opinion issued on PCT/KR2015/003782 (pp. 6).
RP-140062, Feb. 25, 2014, 3GPP TSG RAN Meeting #63, Fukuoka, Japan, Mar. 3-6, 2014, Motivation of New SI proposal: Evolving LTE with Flexible Duplex for Traffic Adaptation, pp. 4.
Lei Wan et al., "Evolving LTE with Flexible Duplex", Globecom 2013 Workshop—Emerging Technologies for LTE-Advanced and Beyond-4G, Dec. 9, 2013, 6 pages.
Huawei, HiSilicon, "New Study Item Proposal for Evolving LTE with Flexible Duplex", RP-140061, 3GPP TSG RAN Meeting #63, Mar. 3-6, 2014, 5 pages.
Huawei, HiSilicon, "UE Demodulation Performance Requirements for eIMTA", R4-141689, 3GPP TSG-RAN WG4 Meeting #70bis, Mar. 31-Apr. 4, 2014, 6 pages.
European Search Report dated Nov. 17, 2017 issued in counterpart application No. 15780034.3-1875, 15 pages.
Japanese Office Action dated Nov. 19, 2018 issued in counterpart application No. 2016-562767, 15 pages.
European Search Report dated Feb. 26, 2019 issued in counterpart application No. 15780034.3-1219, 9 pages.
Chinese Office Action dated Feb. 3, 2019 issued in counterpart application No. 201410154276.5, 20 pages.

\* cited by examiner

[Fig. 1]
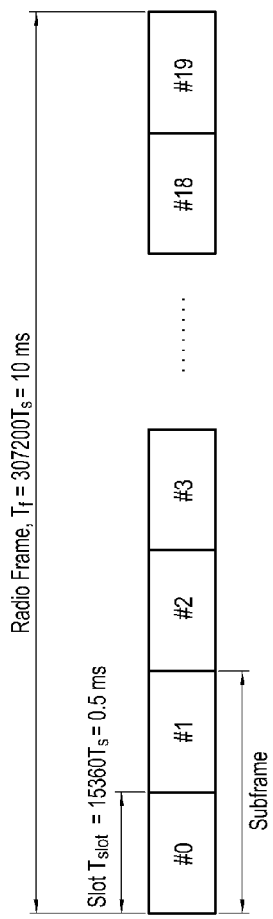

[Fig. 2]
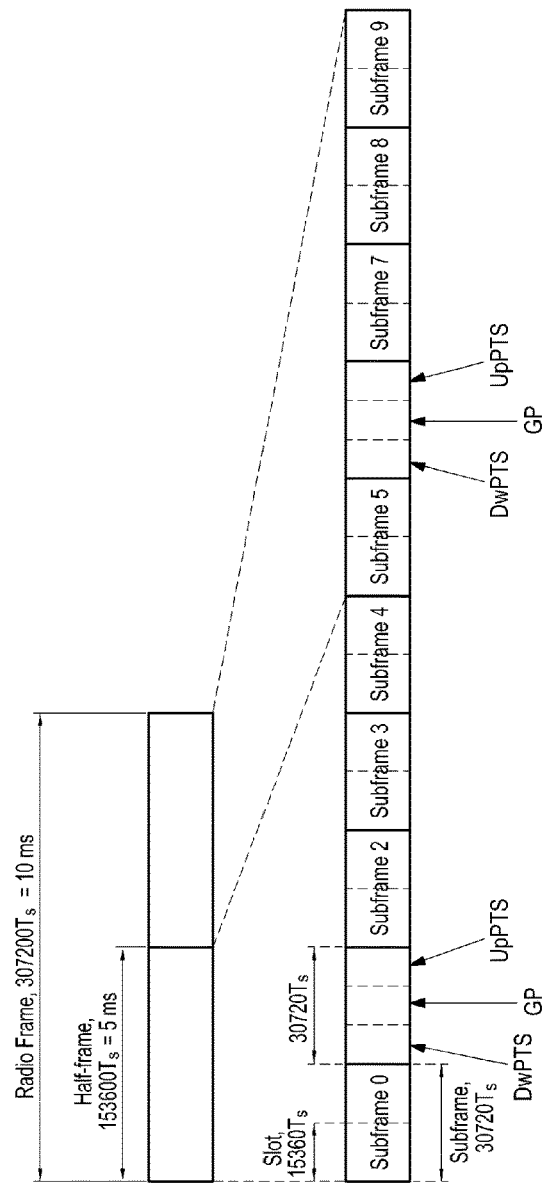
[Fig. 3]
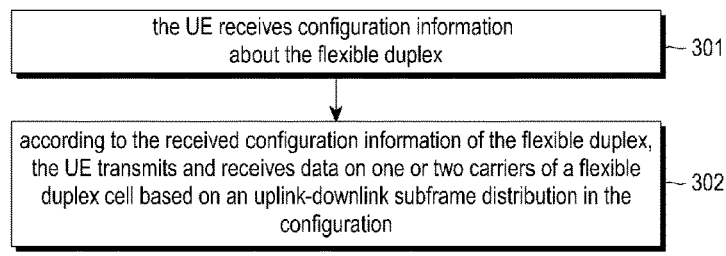
[Fig. 4]
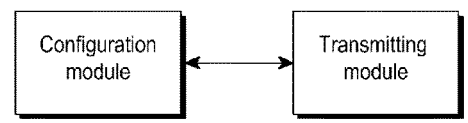

METHOD AND APPARATUS FOR PROCESSING FLEXIBLE DUPLEX

PRIORITY

This application is a National Phase Entry of PCT International Application No. PCT/KR2015/003782, which was filed on Apr. 15, 2015, and claims priority to Chinese Patent Application No. 20140154276.5, which was filed on Apr. 17, 2014, the contents of each of which are incorporated herein by reference.

TECHNICAL FIELD

The present invention relates to radio communication techniques, and more particularly, to a method and an apparatus for processing a duplex system.

BACKGROUND ART

Long-term evolution (LTE) system of 3rd generation partnership project (3GPP) supports two duplex modes including frequency division duplex (FDD) and time division duplex (TDD). As shown in FIG. 1, for the FDD system, each radio frame is of 10 ms length, consists of ten 1 ms subframes. Each subframe consists of two consecutive 0.5 ms slots, i.e., the kth subframe includes slot 2k and slot 2k+1. As shown in FIG. 2, for the TDD system, each 10 ms radio frame is divided into two 5 ms half-frames. Each half-frame includes eight 0.5 ms slots and three special slots, i.e., downlink pilot slot (DwPTS), guard period (GP) and uplink pilot slot (UpPTS). The total length of the three special slots is 1 ms. Each subframe consists of two consecutive slots, i.e., the kth subframe includes slots 2k and slot 2k+1. One downlink transmission time interval (TTI) is defined in one subframe.

The TDD system supports 7 kinds of uplink-downlink configurations, as shown in Table 1. Herein, D denotes downlink subframe, U denotes uplink subframe, and S denotes a special subframe including the above three special fields.

TABLE 1

Table 1 uplink-downlink configurations of LTE TDD

| Configuration index | Switching point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

First n OFDM symbols of each downlink subframe may be used for transmitting downlink control information. The downlink control information includes physical downlink control channel (PDCCH) and other control information, wherein n=0, 1, 2, 3 or 4; remaining OFDM symbols may be used for transmitting physical downlink shared channel (PDSCH) or Enhanced PDCCH (EPDCCH). In the LTE system, PDCCH/EPDCCH is used for bearing downlink control information (DCI) allocating uplink channel resources or downlink channel resources, respectively referred to as downlink grant (DL Grant) and uplink grant (UP Grant). Grants of different UEs are transmitted independently, and the DL Grant and the UL Grant are also transmitted independently.

In order to meet the increasing traffic traffic requirement of mobile users, in LTE-A, flexible TDD re-configuration technique gets more and more attention, i.e., eIMTA. The eIMTA rapidly adjusts current proportion of uplink subframe to downlink subframe, so as to make it more suitable for current proportion of current uplink traffic traffic and downlink traffic traffic, which helps to increase uplink and downlink peak rates of the user and increases throughput of the system.

In enhanced system of the LTE system, a wider working bandwidth is obtained through combining multiple component carriers, i.e., carrier aggregation (CA), to form downlink and uplink of the communication system and therefore support higher transmission rate. For one UE, a base station may configure it to work in multiple cells, one of them is a primary cell (PCell) and others are secondary cells (SCell). Herein, the multiple aggregated CCs may adopt the same FDD or TDD duplex manner or adopt different duplex manners.

In further research of the LTE system, in order to improve system performance, a following research is to configure uplink and downlink subframes on each carrier of a pair of carriers of the FDD system (e.g., a pair of uplink and downlink carriers in the FDD system) at the same time, so as to be more suitable for variation of uplink and downlink traffics.

DISCLOSURE OF INVENTION

Solution to Problem

Embodiments of the present invention provide a method and an apparatus for processing flexible duplex, so as to support, in a cell consists of a pair of carriers (e.g., FDD cell), flexible uplink and downlink subframe distribution on the pair of carriers or one of the pair of carriers, thereby be more suitable for variation of the uplink and downlink traffics.

According to an embodiment of the present invention, a method for processing flexible duplex includes:

receiving, by a UE, configuration information of flexible duplex; and according to the received configuration information of flexible duplex, transmitting and receiving data by the UE based on configured uplink and downlink subframe distribution(s) on one or two carriers of a flexible duplex cell.

Preferably, if more uplink UL subframe resources are required than downlink DL subframe resources, or if equal uplink UL subframe resources and downlink DL subframe resources are required, in one period, some subframes on a flexible duplex-uplink (FD-UL) are downlink subframes, and all subframes on the FD-DL are downlink subframes;

if more UL subframe resources are required than DL subframe resources, in one period, all subframes on the FD-UL are uplink subframes, and some subframes on the FD-DL are uplink subframe;

wherein for a pair of carriers of the flexible duplex cell, the FD-DL is a carrier used for downlink transmission for a backward FDD UE, and FD-UL is a carrier used for uplink transmission for the backward FDD UE.

Preferably, the uplink and downlink subframe distribution of the flexible duplex cell is obtained through semi-static configuration; or the uplink and downlink subframe distribution of the flexible duplex cell is obtained through re-configuration downlink control information (DCI).

Preferably, the re-configuration DCI is transmitted on the FD-DL.

Preferably, if the flexible duplex cell is a secondary cell of the UE, the uplink and downlink subframe distribution of the flexible duplex cell is obtained in the re-configuration DCI of a primary cell.

Preferably, the uplink and downlink subframe distribution on the FD-UL is obtained according to the re-configuration DCI; or the uplink and downlink subframe distribution on the FD-UL and the uplink and downlink subframe distribution on the FD-DL are obtained respectively from the re-configuration DCI; or a joint indication indicating the uplink and downlink subframe distribution of a pair of carriers of the flexible duplex cell is obtained from an indication field of the re-configuration DCI.

Preferably, a periodicity of an uplink and downlink subframe pattern on the FD-UL is Tms.

Preferably, the periodicity of an uplink and downlink subframe pattern on the FD-UL is 10 ms; on one carrier of the flexible duplex carrier, the number of uplink subframes allocated in one 10 ms period is some or all values from 0 to 10.

Preferably, the periodicity of an uplink and downlink subframe pattern on the FD-UL is 8 ms, on one carrier of the flexible duplex carrier, the number of uplink subframes allocated in one 8 ms period is some or all values from 0 to 8.

Preferably, the periodicity T of the uplink and downlink subframe pattern is 40 ms, and 40 bits are utilized to respectively indicate a duplex direction of each subframe in the period.

Preferably, if an index of an ABSF subframe is n, subframe n+4 on the FD-UL is configured as a downlink subframe.

Preferably, the method further includes: for a downlink subframe on the FD-UL, an HARQ-ACK timing position of a downlink subframe on a same position of the FD-DL as the downlink subframe on the FD-UL is re-used for feeding back HARQ-ACK information.

Preferably, the method further includes: obtaining CRS structures of all possible downlink subframes on the FD-UL according to bit mapping.

Preferably, a transmission power of a CRS resource element on the FD-UL is the same as the FD-DL.

Preferably, a timing advance of the UE is controlled by a base station, there is an interval between the base station receives an uplink subframe and transmits a downlink subframe, the interval is used for switching time from uplink to downlink.

Preferably, the downlink subframe is a shortened downlink subframe, the downlink subframe includes an interval between downlink transmission time and uplink transmission time.

Preferably, the downlink subframe is shortened by one OFDM symbol, and conflict between receiving and transmission of the UE is avoided through scheduling of the base station; or a plurality of shortened lengths of different number of OFDM symbols are defined in advance, and the UE determines to adopt which shortened length according to a semi-static configuration of higher layer signaling.

Preferably, the uplink transmission on the FD-DL and the uplink transmission on the FD-UL are processed according to a same timing advance group (TAG); or the uplink transmission on the FD-DL and the uplink transmission on the FD-UL are processed according to different TAGs.

Preferably, the method further includes: measuring path loss (PL) based on downlink signals on the FD-UL, and applying the PL to uplink power control of the UE.

The present disclosure further provides an apparatus for processing flexible duplex, including: a configuration module and a transmission module; wherein a configuration module and a transmitting module; wherein the configuration module is to receive configuration information of flexible duplex; and the transmitting module is to transmit and received data according to an uplink and downlink subframe distribution on one or two carriers of a flexible duplex cell based on the received configuration information of the flexible duplex.

It can be seen from the above technical solution that, the method and apparatus of the present disclosure support to configure uplink and downlink subframes at the same time on a pair of carriers or one of the pair of carriers of a flexible duplex cell, thus can meet the requirement of the uplink and downlink traffics better.

BRIEF DESCRIPTION OF DRAWINGS

FIG. 1 is a schematic diagram illustrating a frame structure of a FDD system.

FIG. 2 is a schematic diagram illustrating a frame structure of a TDD system.

FIG. 3 is a flowchart illustrating a method for processing flexible duplex according to various embodiments of the present disclosure.

FIG. 4 is a schematic diagram illustrating a structure of an apparatus for processing flexible duplex according to various embodiments of the present disclosure.

BEST MODE FOR CARRYING OUT THE INVENTION

The present invention will be described in further detail hereinafter with reference to accompanying drawings and embodiments to make the objective, technical solution and merits therein clearer.

In an existing FDD system, each cell includes a pair of carriers respectively used for uplink transmission and downlink transmission. In the existing FDD system, the duplex direction of each carrier is fixed and bandwidths of two carriers are generally the same, i.e., the proportion of the uplink to downlink physical resources is 1:1. However, in most cases, downlink traffics are apparently more than uplink traffics. For example, the downlink traffics may be 37 times of the downlink traffics.

In order to be fit for the uplink and downlink traffic variation, for a cell consists of two carriers, it is possible to allocate subframes with two duplex directions on one carrier, or respectively allocate subframes of two duplex directions on each carrier. Herein, the two carriers of the cell may be a pair of carriers capable of being used by a FDD cell, or not restricted to a pair of carriers capable of being used by a FDD cell. In the present disclosure, such a system is referred to as a flexible duplex system. Accordingly, such a cell is referred to as a flexible duplex cell. The UE supporting the flexible duplex scheme is referred to as a flexible duplex UE.

In description of the present disclosure, for the flexible duplex cell, the carriers of it are respectively referred to as a flexible duplex-downlink carrier (FD-DL) and a flexible duplex-uplink carrier (FD-UL). If a backward FDD UE is able access a flexible duplex cell, the FD-DL is used for downlink transmission of the backward FDD UE and the FD-UL is used for uplink transmission of the backward FDD UE. According to a traffic requirement, downlink traffics are more than uplink traffics in a typical scenario, therefore some subframes on the FD-UL may be used for downlink data transmission. However, there are also some situations that uplink traffics are more than downlink traffics. At this time, some subframes on the FD-DL may be used for uplink transmission.

According to the above analysis, in order to adapt traffic variations, the following three methods are provided in the present disclosure.

In a first method, merely some subframes on the FD-UL are allowed to change their duplex direction, and all subframes on the FD-DL are fixed to be downlink;

In a second method, subframes on one of the two carriers (FD-UL or FD-DL) of the flexible duplex cell may change their duplex direction. But when the duplex direction of some subframes on one carrier is changed, the duplex direction of all subframes of the other carrier is kept to be the same.

In a third method, the duplex directions of some subframes on the two carriers (FD-UL and FD-DL) of the flexible duplex cell are allowed to be changed respectively.

For the above second method, if the required UL subframe resources are less than or equal to the DL subframe resources, in one period, some downlink subframes are allocated on the FD-UL and the FD-DL are all downlink. If the required UL subframe resources are more than the DL subframe resources, in one period, the FD-UL are all uplink and some uplink subframes are allocated on FD-DL. The above period may be a fixed number of subframes, a radio frame or multiple radio frames. The above second method supports all uplink-downlink subframe proportions supported by the third method, and allows fewer number of pattern of uplink-downlink subframe distribution. However, the above third method is more flexible.

For a flexible duplex cell, the uplink-downlink subframe distribution of a pair of carriers or one of the pair of carriers may be configured semi-statically. For example, a actual uplink-downlink subframe distribution of the flexible duplex cell may be indicated in broadcast signaling, such that it is applied to all flexible duplex UEs. Or, for the flexible duplex cell, the uplink-downlink subframe distribution of a pair of carriers or one of the pair of carriers may also be configured for each flexible duplex UE or each group of flexible duplex UEs via RRC signaling.

For the flexible duplex cell, the uplink-downlink subframe distribution of a pair of carriers or one of the pair of carriers may be configured dynamically, i.e., via physical layer control signaling. For example, the signaling may be DCI, referred to as re-configuration DCI hereinafter, transmitted to all UEs of the cell, indicating the actual uplink-downlink subframe distribution of the flexible duplex cell. The re-configuration DCI may be transmitted in a common search space (CSS) of the FD-DL. For example, the re-configuration DCI may be transmitted on a candidate PDCCH of the CSS for all UEs or transmitted on a candidate PDCCH of the CSS for each group of UEs. Or, the re-configuration DCI may also be transmitted in a UE-specific search space (USS). For example, the re-configuration DCI is transmitted for each UE or each group of UEs to indicate the uplink-downlink subframe distribution of the flexible duplex cell. Suppose that the FD-DL is fixed to be all downlink and the re-configuration DCI is transmitted on the FD-DL, thus each subframe of the FD-DL may be used for transmitting the re-configuration DCI. If uplink subframes are configured on the FD-DL and the re-configuration DCI is transmitted on the FD-DL, the re-configuration DCI can be transmitted on merely downlink subframes on the FD-DL. If the flexible duplex cell is a unique serving cell of the UE, the re-configuration DCI may be transmitted on the FD-DL and indicates the uplink-downlink subframe distribution of the FD-UL. Or, the re-configuration DCI is transmitted on the FD-DL and respectively indicates the uplink-downlink subframe distributions of the FD-UL and the FD-DL. Or, the re-configuration DCI may be transmitted on the FD-DL and jointly indicates the uplink-downlink subframe distributions of a pair of carriers of the flexible duplex cell via an indicating field. Or the re-configuration DCI may be respectively transmitted on FD-DL and FD-UL, and each re-configuration DCI indicates the uplink-downlink subframe distribution of the carrier where it is transmitted.

If the flexible duplex cell acts as a secondary cell of the UE, the uplink-downlink subframe distribution of the flexible duplex cell may be indicated in the re-configuration DCI of the PCell. If uplink and downlink subframes are allowed to be configured on merely the FD-UL, the re-configuration DCI of the PCell indicates the uplink-downlink subframe distribution of the FD-UL for the flexible duplex cell. Or, if two carriers of the flexible duplex cell are allowed to configure both uplink and downlink subframes, the re-configuration DCI on the PCell respectively indicates the uplink-downlink subframe distributions on the FD-UL and the FD-DL for the flexible duplex cell. Or, a joint indication field in the re-configuration DCI of the PCell may be used to indicate the uplink-downlink subframe distributions of the pair of carriers of the flexible duplex cell.

FIG. 3 is a flowchart illustrating a method for processing flexible duplex according to various embodiments of the present disclosure. The method includes the following.

At block 301, the UE receives configuration information about the flexible duplex.

At block 302, according to the received configuration information of the flexible duplex, the UE transmits and receives data on one or two carriers of a flexible duplex cell based on the configured uplink-downlink subframe distribution(s).

Hereinafter, four embodiments are described.

Embodiment 1

In this embodiment, for one or each carrier of the flexible duplex cell, uplink and downlink subframes are allocated with a period of 10 ms. This method is consistent with the structure of the 10 ms frame in existing LTE system. Thus, the complexity of the standard and the implementation of the UE are reduced.

The re-configuration period is denoted by N×10 ms, wherein N is larger than or equal to 1, and the re-configuration DCI can be transmitted in merely the last radio frame of a re-configuration period. It is supposed that the re-configuration DCI is transmitted on the FD-DL. For the situation that the FD-DL is fixed to be all downlink, the last radio frame of each period on the FD-DL is able to support at most 10 downlink subframes used for transmitting the re-configuration DCI. If the FD-DL is also configured with uplink subframe, only the downlink subframes of the FD-DL can transmit the re-configuration DCI, i.e., the number of downlink subframes of the last radio frame of each period on the FD-DL determines the maximum number of subframes used for transmitting the re-configuration DCI.

Hereinafter, the method for indicating the uplink-downlink subframe distribution of the flexible duplex cell is described.

On one carrier of the flexible duplex cell, suppose that the period is 10 ms, the number of uplink subframes allocated in one period can be 1, 2, 3, 4, 5, or 6. For example, it may be just one of the 7 configurations of existing LTE FDD system. According to this method, for the flexible duplex cell, it is restricted that there are at most 6 uplink subframes on one carrier. For example, on the FD-UL, one of the 7 configurations of the existing LTE TDD system is configured for the flexible duplex cell. Therefore, the indication may be realized via 3 bits.

On one carrier of the flexible duplex cell, suppose that the period is 10 ms, the number of uplink subframes allocated in one period may be some or all values from 0 to 10. For example, it is possible to add, based on the 7 configurations in the existing LTE TDD system, uplink-downlink subframe distributions which support 0, 7, 8, 9, 10 uplink subframes in the 10 ms and support some or all of the above uplink-downlink subframe distributions. For the situation that there are 7, 8 or 9 subframes in the 10 ms, it is required to define pattern of the uplink-downlink subframe distribution in the 10 ms.

Table 2 shows an example of the uplink-downlink subframe distribution, wherein "D" denotes a subframe dedicatedly used for downlink transmission, "U" denotes a subframe dedicated used for uplink transmission, "S" denotes special subframe. "S" may include downlink part (DwPTS), guard period (GP) and uplink part (UpPTS). If the impact of merely the switching time is considered, the length of GP may be just one OFDM symbol. For the situation that there are 7 or 8 uplink subframes, there may be one or more switching points in one period. If there are two switching points in 10 ms, the downlink subframes are preferably distributed in subframes 0 and 5, so as to be consistent with the existing LTE TDD system. The present disclosure is not intended to restrict to these uplink-downlink subframe distributions.

TABLE 2

Table 2: uplink-downlink subframe distributions of a 10 ms period

| Number of uplink subframes | Downlink-uplink switching point periodicity | Index of subframes in uplink-downlink switch period | | | | | | | | | |
|---|---|---|---|---|---|---|---|---|---|---|---|
| | | 0 | 1 | 2 | 3 | 4 | 5 | 6 | 7 | 8 | 9 |
| 7 | 10 ms | S | U | U | U | U | D | S | U | U | U |
| 7 | 10 ms | D | D | S | U | U | U | U | U | U | U |
| 8 | 10 ms | S | U | U | U | U | S | U | U | U | U |
| 8 | 10 ms | D | S | U | U | U | U | U | U | U | U |
| 9 | 10 ms | S | U | U | U | U | U | U | U | U | U |

In addition, for the situation that there are 3 uplink subframes in the 10 ms, it is also possible to adopt the uplink-downlink subframe distribution as shown in Table 3 which includes two switching points, instead of the uplink-downlink configuration 3 of the existing LTE TDD system.

TABLE 3

Table 3: uplink-downlink subframe distribution of a 10 ms period

| Number of uplink subframes | Downlink-uplink switching point periodicity | Index of subframes in uplink-downlink switch period | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | D | D | S | U | D | D |

Hereinafter, several typical methods for configuring uplink-downlink subframe distribution on a carrier of a flexible duplex cell are described. But the present disclosure is not intended to be restricted to the following methods.

Based on the 7 configurations of the existing LTE TDD system, it is possible to add a distribution that all the 10 ms are uplink. For example, on the FD-UL, the 7 configurations of the existing LTE TDD system and the distribution of all uplink subframes are supported. Thus, there are 8 configurations on the carrier altogether, which may be thus denoted by 3 bits.

Based on the 7 configurations of the existing LTE TDD system, it is also possible to add a distribution that all the 10 ms are downlink. For example, on the FD-DL, the 7 configurations of the existing LTE TDD system and the distribution of all downlink subframes are supported. Thus, there are 8 configurations on the carrier altogether, which may be thus denoted by 3 bits.

Based on the 7 configurations of the existing LTE TDD system, it is also possible to add both the distribution of all downlink in the 10 ms and the distribution of all uplink in the 10 ms. For example, on the FD-UL, suppose that the 7 configurations of the LTE TDD system are all supported. Therefore, there are 9 configurations on the carrier altogether. Alternatively, in order to reduce bit overhead, one or more of the 7 configurations of the existing LTE TDD system may be forbidden, and the distributions which support all uplink and all downlink are supported. Thus, there are no more than 8 configurations on the carrier altogether, which may be denoted by 3 bits. For example, the forbid existing TDD uplink-downlink configuration may be uplink-downlink configuration 2 or 4.

Based on the 7 configurations of the existing LTE TDD system, uplink-downlink subframe distributions which support 7, 8, 9 and 10 uplink subframes in the 10 ms may be added, so as to control the uplink-downlink subframe proportion on the carrier more flexibly. According to this method, there are at most 11 possible configurations on one carrier. Herein, it is still possible to restrict the number of allowed uplink-downlink subframe distributions to be 8, so as to denote it by 3 bits. For example, an uplink-downlink subframe distribution in which there are 10 uplink subframes in the 10 ms may be kept for the carrier, and the uplink-downlink subframe distributions of 7 other number of uplink subframes are supported, e.g., the distributions in which the numbers of uplink subframes are 1, 2, 3, 4, 5, 6, and 8.

Based on the 7 configurations of the existing LTE TDD system, uplink-downlink subframe distributions which support 0, 7, 8, 9 subframes in the 10 ms may be added, so as to control the uplink-downlink subframe proportion on the carrier more flexibly. According to this method, there are at most 11 possible configurations on one carrier. Herein, it is still possible to restrict the number of allowed uplink-downlink subframe distributions to be 8, so as to denote it by 3 bits. For example, an uplink-downlink subframe distribution in which there is 0 uplink subframe in the 10 ms may be kept for the carrier, and the uplink-downlink subframe distributions of 7 other numbers of uplink subframes are also supported, e.g., the distributions in which the numbers of uplink subframes are 1, 2, 3, 4, 5, 6, and 8.

Based on the 7 configurations of the existing LTE TDD system, uplink-downlink subframe distributions which support 0, 7, 8, 9 and 10 subframes in the 10 ms may be added, so as to control the uplink-downlink subframe proportion on the carrier more flexibly. According to this method, there are at most 12 possible configurations on one carrier. Herein, it is still possible to restrict the number of allowed uplink-downlink subframe distributions to be 8, so as to denote it by 3 bits. For example, uplink-downlink subframe distributions in which there are 0 and 10 uplink subframes in the 10 ms may be kept for the carrier, and the uplink-downlink subframe distributions of 6 other numbers of uplink subframes are also supported, e.g., the distributions in which the numbers of uplink subframes are 1, 2, 3, 4, 6, and 8.

The above describes methods for configuring uplink-downlink subframe distribution on a carrier of a flexible duplex cell. When the uplink-downlink subframe distribution of the flexible duplex cell is configured, if subframes of two duplex directions are allowed to be configured on merely one of the carriers, just the uplink-downlink subframe distribution of this carrier is required to be indicated. If subframes of two duplex directions are configured on a pair of carriers of the flexible duplex cell, two independent indication fields may be utilized to respectively indicate the uplink-downlink subframe distributions of the two carriers. It is also possible to use a joint indication field to indicate the uplink-downlink subframe distributions of the two carriers. The uplink-downlink subframe distributions of the two carriers may meet a particular restriction, so as to reduce overhead of the joint indication of the uplink-downlink subframe distributions of the two carriers. If subframes of two duplex directions cannot be configured on two carriers of the flexible duplex cell at the same time, if a traffic requires more DL subframe resources than UL subframe resources, the FD-DL is completely used for downlink and some subframes on the FD-UL are used for downlink. If the traffic requires equal UL subframe resources and DL subframe resources, the FD-DL is completely used for downlink and the FD-UL is completely used for uplink. If the traffic requires more UL subframe resources than DL subframe resources, the FD-UL is completely used for uplink. For example, if the FD-DL is completely downlink, the allowed number of uplink subframes on the FD-UL is 1~10; and when the FD-UL is completely uplink, the allowed number of uplink subframes on the FD-DL is 0~6. Thus, 16 uplink-downlink subframe distributions are required altogether, which may be indicated by 4 bits.

If downlink subframes are allocated on the FD-UL, the UE cannot feed back HARQ-ACK information on this timing position. Therefore, it is required to re-define the HARQ timing relationship of the PDSCH, such that the UE is able to feed back the HARQ-ACK information of PDSCH of all downlink subframes. The detailed HARQ timing relationship is not intended to be restricted in the present disclosure. Suppose that the downlink subframes on the FD-UL are a subset of the downlink subframes on the FD-DL. For example, FD-DL is completely configured with downlink subframes and there may be uplink and downlink subframes on the FD-UL at the same time. Thus, the downlink subframe on the FD-UL may re-use the HARQ-ACK timing relationship of the downlink subframe on the same position on the FD-DL, so as to reduce complexity of the base station and the processing of the UE.

When downlink subframes are configured on the FD-UL, there are three possible types of downlink subframes. In the first type, the CRS structure of a normal subframe is adopted, so as to be favorable to support downlink transmission modes 1~9. In the second type, the CRS structure of MBSFN is adopted, which reduces CRS overhead and the generated interferences. In the third type, the CRS in a subframe is completely removed, so as to maximize the number of REs used for transmitting downlink data and avoid CRS interferences. The CRS resource element (RE) on the FD-UL may have the same transmission power with the CRS RE on the FD-DL. Or, higher layer signaling may also be utilized to additionally configure a transmission power for the CRS RE on the FD-UL. For example, a broadcast signaling or RRC signaling may be utilized. Suppose that at most N downlink subframes may be configured on the FD-UL. Thus, N bits may be used to indicate possible CRS types of the downlink subframes, e.g., N=9. Or, the number of subframes which do not adopt the CRS structure of a normal subframe on the FD-UL may be restricted to no more than 6, so as to be consistent with the maximum number of MBSFN subframes in each radio frame of the existing LTE system.

According to this method, suppose that ABSF is configured on the FD-DL. The index of an ABSF subframe is denoted by n. Since UL Grant is not transmitted on the ABSF, subframe n+4 on the FD-UL also cannot be used for transmitting PUSCH. In order to sufficiently utilize the resources on the FD-UL, the subframe n+4 on the FD-UL may be configured as a downlink subframe, so as to transmit downlink data in this subframe and utilize frequency resources sufficiently. Since the ABSF configuration may have a periodicity of 40 ms and the periodicity of the uplink-downlink subframe distribution of the FD-UL is 10 ms, the downlink subframe on the FD-UL may be not corresponding to the ABSF on the FD-DL one by one. At this time, relationship of the position of the downlink subframe on the FD-UL and the ABSF may be processed by the base station, so as to use the subframe on the FD-UL corresponding to the ABSF subframe on the FD-DL for downlink transmission as much as possible to improve system performance.

Similarly, according to this method, suppose that MBSFN is configured on the FD-DL. For MBSFN subframe n, if it is actually used for broadcast traffic, or if downlink transmission modes 1~8 are currently configured, i.e., unicast downlink data is not transmitted in MBSFN subframe, no HARQ-ACK is required to be fed back in the subframe n+4 on the FD-UL. The subframe n+4 on the FD-UL may also be used for downlink transmission preferably, so as to reduce impact to backward UE. If the periodicity of the MBSFN configuration is 40 ms, since the periodicity of the uplink-downlink subframe distribution on the FD-UL is 10 ms, the downlink subframe on the FD-UL may not correspond to the MBSFN on the FD-DL one by one. At this time, relationship of the position of the downlink subframe on the FD-UL and the MBSFN may be processed by the base station, so as to use the subframe on the FD-UL corresponding to the MBSFN subframe on the FD-DL for downlink transmission as much as possible to improve system performance.

Embodiment 2

In this embodiment, for one carrier or each carrier in the flexible duplex cell, another repetition periodicity of the uplink-downlink subframe distribution is adopted, which is not restricted to the 10 ms radio frame structure. Since the LTE FDD adopts 8 ms HARQ round trip time (RTT), the uplink-downlink subframe distribution on a carrier may be allocated with a period of 8 ms to match the HARQ RTT of the LTE FDD.

On one carrier of the flexible duplex cell, the number of uplink subframes allocated in each 8 ms period may be some or all values from 0 to 8. For example, on the FD-UL, at least one uplink subframe may be kept for transmitting uplink signal. Thus the number of uplink subframes in the 8 ms is 1~8, which may be denoted by 3 bits. Alternatively, on the FD-DL, a certain number of downlink subframes need to be kept to serve a backward UE and transmit downlink control information. In an extreme situation, suppose that there needs at least one downlink subframe. Thus, the number of uplink subframes in the 8 ms is 0~7, which may be denoted by 3 bits.

The above describes methods for configuring uplink-downlink subframe distribution on a carrier of a flexible duplex cell. When the uplink-downlink subframe distribution of the flexible duplex cell is configured, if subframes of two duplex directions are allowed to be configured on merely one of the carriers, just the uplink-downlink subframe distribution of this carrier is required to be indicated. If subframes of two duplex directions are configured on a pair of carriers of the flexible duplex cell, two independent indication fields may be utilized to respectively indicate the uplink-downlink subframe distributions of the two carriers. It is also possible to use a joint indication field to indicate the uplink-downlink subframe distributions of the two carriers. The uplink-downlink subframe distributions of the two carriers may meet a particular restriction, so as to reduce overhead of the joint indication of the uplink-downlink subframe distributions of the two carriers. If subframes of two duplex directions cannot be configured on two carriers of the flexible duplex cell at the same time, if a traffic requires more DL subframe resources than UL subframe resources, the FD-DL is completely used for downlink and some subframes on the FD-UL are used for downlink. If the traffic requires equal UL subframe resources and DL subframe resources, the FD-DL is completely used for downlink and the FD-UL is completely used for uplink. If the traffic requires more UL subframe resources than DL subframe resources, the FD-UL is completely used for uplink. For example, if the FD-DL is completely downlink, the allowed number of uplink subframes on the FD-UL is 1~8; and when the FD-UL is completely uplink, uplink subframes may be allocated on the FD-DL. Thus, the uplink-downlink subframe distributions on the FD-UL and the FD-DL may be indicated by 4 bits.

Denote the number of uplink subframes in the 8 ms period is $N_{UL}$, a distribution pattern of the NUL uplink subframes in the 8 ms period has to be defined. Hereinafter, two possible criteria for configuring patterns of the uplink and downlink subframes are described, but the present disclosure is not intended to be restricted to the two criteria.

A first criterion for configuring the pattern of the uplink and downlink subframes is to reduce the number of uplink-downlink switching point as much as possible. This is because a guard period (GP) of a particular length is required at the switching point to avoid interferences of uplink and downlink signals, and also due to the downlink-uplink switching time and switch procedure of the base station and the UE. Based on this criteria, the $N_{UL}$ uplink subframes in the 8 ms period may occupy consecutive time, as shown in Table 4 which shows patterns of the uplink and downlink subframes, wherein "D" denotes a subframe dedicatedly used for downlink transmission, "U" denotes a subframe dedicated used for uplink transmission, "S" denotes special subframe. "S" may include downlink part (DwPTS), guard period (GP) and uplink part (UpPTS). If the impact of merely the switching time is considered, the length of GP may be just one OFDM symbol.

TABLE 4

Table 4: uplink and downlink subframe distribution in the 8 ms period

| Uplink-downlink configuration | Downlink-uplink switching point periodicity | Index of subframes in uplink-downlink switch period | | | | | | | |
|---|---|---|---|---|---|---|---|---|---|
| | | 0 | 1 | 2 | 3 | 4 | 5 | 6 | 7 |
| 0 | 8 ms | U | U | U | U | U | U | U | U |
| 1 | 8 ms | S | U | U | U | U | U | U | U |
| 2 | 8 ms | S | U | U | U | U | U | U | D |
| 3 | 8 ms | S | U | U | U | U | U | D | D |
| 4 | 8 ms | S | U | U | U | U | D | D | D |
| 5 | 8 ms | S | U | U | U | D | D | D | D |
| 6 | 8 ms | S | U | U | D | D | D | D | D |
| 7 | 8 ms | S | U | D | D | D | D | D | D |

The second criterion for configuring the pattern of the uplink and downlink subframes is to reduce impact to the CSI-RS resource allocation and SRS transmission as much as possible. This is because the allocation period of the CSI-RS and SRS is integer times of 5 ms. When uplink and downlink subframes are configured according to the 8 ms periodicity, it may be resulted that on some positions, CSI-RS cannot be allocated due to the current subframe is an uplink subframe, or SRS cannot be transmitted due to the current subframe is a downlink subframe. Table 5 shows example patterns of uplink and downlink subframes configured according to this criterion, which is able ensure the resource allocation of the CSI-RS and SRS as much as possible. For example, for the pattern including two uplink subframes, it is ensured that SRS symbol which is allocated with a period of 20 ms is always allocated on an uplink subframe; for a pattern including four downlink subframes, it is ensured that the SRS symbol allocated with a period of 10 ms is always allocated on the uplink subframe, and it is also ensured that the CSI-RS allocated with the period of 10 ms is always allocated on the downlink subframe. But this method has much switching points and thus wastes resources.

TABLE 5

Table 5: uplink and downlink subframe distribution in 8 ms periodicity

| Uplink-downlink configuration | Downlink-uplink switching point periodicity | Index of subframes in uplink-downlink switch period | | | | | | | |
|---|---|---|---|---|---|---|---|---|---|
| | | 0 | 1 | 2 | 3 | 4 | 5 | 6 | 7 |
| 0 | 8 ms | U | U | U | U | U | U | U | U |
| 1 | 8 ms | S | U | U | U | U | U | U | U |
| 2 | 8 ms | S | U | U | U | S | U | U | U |
| 3 | 8 ms | S | U | S | U | S | U | U | U |
| 4 | 8 ms | S | U | S | U | S | U | S | U |
| 5 | 8 ms | D | D | S | U | S | U | S | U |

TABLE 5-continued

Table 5: uplink and downlink subframe distribution in 8 ms periodicity

| Uplink-downlink configuration | Downlink-uplink switching point periodicity | Index of subframes in uplink-downlink switch period | | | | | | | |
|---|---|---|---|---|---|---|---|---|---|
| | | 0 | 1 | 2 | 3 | 4 | 5 | 6 | 7 |
| 6 | 8 ms | D | D | S | U | D | D | S | U |
| 7 | 8 ms | D | D | D | D | D | D | S | U |

When the uplink and downlink subframe pattern is configured on the FD-UL with the period of 8 ms, since some uplink subframes are used for downlink transmission, the UE cannot feed back HARQ-ACK information on this timing position. It is required to re-define the HARQ timing relationship of the PDSCH, such that the UE is able to feed back the HARQ-ACK information of PDSCH of all downlink subframes. The detailed HARQ timing relationship is not intended to be restricted in the present disclosure. Suppose that the downlink subframes on the FD-UL are a subset of the downlink subframes on the FD-DL. For example, FD-DL is completely configured with downlink subframes and there may be uplink and downlink subframes on the FD-UL at the same time. Thus, the downlink subframe on the FD-UL may re-use the HARQ-ACK timing relationship of the downlink subframe on the same position on the FD-DL, so as to reduce complexity of the base station and the processing of the UE.

When downlink subframes are configured on the FD-UL, there are three possible types of downlink subframes. In the first type, the CRS structure of a normal subframe is adopted, so as to be favorable to support downlink transmission modes 1~9. In the second type, the CRS structure of MBSFN is adopted, which reduces CRS overhead and the generated interferences. In the third type, the CRS in a subframe is completely removed, so as to maximize the number of REs used for transmitting downlink data and avoid CRS interferences. The CRS resource element (RE) on the FD-UL may have the same transmission power with the CRS RE on the FD-DL. Or, higher layer signaling may also be utilized to additionally configure a transmission power for the CRS RE on the FD-UL. For example, a broadcast signaling or RRC signaling may be utilized. According to this method, suppose that ABSF is configured on the FD-DL. The index of an ABSF subframe is denoted by n. Since UL Grant is not transmitted on the ABSF, subframe n+4 on the FD-UL also cannot be used for transmitting PUSCH. In order to sufficiently utilize the resources on the FD-UL, the subframe n+4 on the FD-UL may be configured as a downlink subframe, so as to transmit downlink data in this subframe and utilize frequency resources sufficiently. Since the ABSF configuration may have a periodicity of 40 ms and the periodicity of the uplink-downlink subframe distribution of the FD-UL is 8 ms, the downlink subframe on the FD-UL may not correspond to the ABSF on the FD-DL one by one. At this time, relationship of the position of the downlink subframe on the FD-UL and the ABSF may be processed by the base station, so as to improve system performance.

According to this method, the uplink and downlink subframe distribution on the FD-UL is configured with a period of 8 ms. But some uplink signals, e.g., PRACH, SRS or VoIP uplink data, are configured with a period of 10 ms, 20 ms or other values which are integer times of 5 ms, which results in that a resource position of uplink data such as PRACH, SRS or VoIP configured on the FD-UL may be configured as a downlink subframe by the signaling indicating the uplink and downlink subframe distribution. This problem may be solved by two methods. A first method works according to the signaling indicating the uplink and downlink subframe distribution, if a subframe is indicated as a downlink subframe, this subframe is merely used for downlink transmission and cannot be used for transmitting PRACH, SRS and VoIP uplink data, etc. A second method works according to configuration information of the PRACH, SRS or VoIP uplink data. If PRACH, SRS or VoIP uplink data is configured in a subframe, the UE may regard it as an uplink subframe and thereby transmitting PRACH, SRS or VoIP uplink data. Take the configuration of the PRACH as an example, since the PRACH resource is configured via broadcast signaling or RRC signaling, the base station may configure that all UEs adopt the same PRACH resource configuration, such that all UEs know that the downlink subframe indicated by the signaling indicating the uplink and downlink subframe distribution is actually used for uplink transmission at present. Therefore, the UEs may have the same knowledge about the actual direction of the subframe. In such a subframe, the PRACH, SRS or VoIP uplink data may be transmitted, and dynamic PUSCH transmission may also be scheduled.

Embodiment 3

In a LTE FDD system, some functions related to subframe types configure subframe pattern periodically. For example, an ABSF pattern may be configured with a periodicity of 40 ms to run eICIC. An MBSFN pattern may be configured with a periodicity of 10 ms or 40 ms. Thus, for one or each carrier of a flexible duplex cell, the uplink and downlink subframe pattern on the FD-UL may be configured according to a certain periodicity T, e.g., T may be 20 ms or 40 ms.

For example, ABSF is configured with a periodicity of 40 ms on the FD-DL. The index of an ABSF subframe is denoted by n. Since UL Grant is not transmitted on the ABSF, subframe n+4 on the FD-UL also cannot be used for transmitting PUSCH. In order to sufficiently utilize the resources on the FD-UL, the subframe n+4 on the FD-UL may be configured as a downlink subframe, so as to transmit downlink data in this subframe and utilize frequency resources sufficiently. Thus, the downlink subframe pattern on the FD-UL may be configured to be corresponding to the ABSF on the FD-DL one by one, which implements the functions of the ABSF and MBSFN subframe and also increases resource utilization ratio.

The uplink and downlink subframe pattern on the FD-UL may be configured via a broadcast signaling, or configured for each UE respectively via RRC signaling. For example, if the period is 40 ms, 40 bits may be utilized to respectively indicate a duplex direction of each subframe in one period. For the flexible duplex cell, the uplink and downlink subframe distribution may also be configured dynamically. In order to reduce overhead, N uplink and downlink subframe patterns with a periodicity of T may be configured in advance. As such, it is only required to use $\lceil \log_2[N] \rceil$ bits to indicate the N patterns in the dynamic re-configuration DCI.

When the uplink and downlink subframe pattern is configured on the FD-UL, since some uplink subframes are used for downlink transmission, the UE cannot feed back HARQ-ACK information on this timing position. Therefore, the HARQ timing relationship of the PDSCH needs to be re-defined, such that the UE is able to feed back the HARQ-ACK information of the PDSCH of all downlink subframes. Herein, the HARQ timing relationship of the PDSCH may be defined with a periodicity of Tms according to the uplink subframe distribution on the FD-UL. Or, the HARQ timing relationship of the PDSCH may still be defined with the periodicity of 10 ms. The subframe pattern with the period of Tms on the FD-UL should ensure that each position used for feeding back HARQ-ACK in the 10 ms is fixed to be uplink subframe. The present disclosure is not intended to restrict the HARQ timing relationship. Suppose that the downlink subframes on the FD-UL are a subset of the downlink subframes on the FD-DL. For example, FD-DL is completely configured with downlink subframes and there may be uplink and downlink subframes on the FD-UL at the same time. Thus, the downlink subframe on the FD-UL may re-use the HARQ-ACK timing relationship of the downlink subframe on the same position on the FD-DL, so as to reduce complexity of the base station and the processing of the UE.

When downlink subframes are configured on the FD-UL, there are three possible types of downlink subframes. In the first type, the CRS structure of a normal subframe is adopted, so as to be favorable to support downlink transmission modes 1~9. In the second type, the CRS structure of MBSFN is adopted, which reduces CRS overhead and the generated interferences. In the third type, the CRS in a subframe is completely removed, so as to maximize the number of REs used for transmitting downlink data and avoid CRS interferences. The CRS resource element (RE) on the FD-UL may have the same transmission power with the CRS RE on the FD-DL. Or, higher layer signaling may also be utilized to additionally configure a transmission power for the CRS RE on the FD-UL. For example, a broadcast signaling or RRC signaling may be utilized.

Embodiment 4

For a flexible duplex cell, a base station may make the downlink transmission timing of the FD-UL and the FD-DL almost the same or completely the same. Thus, on the FD-UL, there may be no synchronization channel, i.e., the UE directly utilize the synchronization relationship detected on the FD-DL for downlink transmission on the FD-UL.

For the flexible duplex cell, if a carrier includes subframes of two duplex directions at the same time, if the subframe structure is still configured consecutively, there is no switching time between adjacent subframes of different duplex directions. In practical, both the base station and the UE need a downlink-to-uplink switching time and an uplink-to-downlink switching time.

The uplink-to-downlink switching time is mainly required by the base station. The reason is as follows. Generally, after impact of the propagation delay is considered, compared with the timing at the base station side, the UE has to transmit uplink signal in advance and receives downlink signal with some delay, thereby a time interval is generated for the switching of the UE. The base station may control the timing advance of the UE, such that a time interval is generated between the timing for receiving uplink subframe and the timing for transmitting downlink subframe and is used for switch from uplink to downlink, e.g., 624 T, corresponding to 20 us, $T_s=1/(15000 \times 2048)$.

For adjacent downlink subframe and uplink subframe, considering the requirement of timing advance of the uplink transmission of the UE, from the perspective of the UE, the start timing of the uplink subframe must be earlier than an ending timing of a complete downlink subframe, which results in overlap of the uplink and downlink subframes. One processing method is to shorten the downlink subframe, so as to generate an interval between the downlink transmission time and the uplink transmission time. In the flexible duplex cell, if UpPTS similar as the LTE TDD system is configured, the downlink subframe in the subframe where the UpPTS is located has to be further shortened, so as to have resources for the UpPTS and the time interval between the downlink transmission time and the uplink transmission time. Hereinafter, a subframe containing a short downlink subframe is referred to as a special subframe.

It is supposed that the special subframe does not include the UpPTS. Therefore, in one method, the downlink subframe is shortened by the length of one OFDM symbol. And conflict between receiving and transmission of the UE is avoided by scheduling of the base station. The length of one OFDM symbol is about 70 us. Thus, the length of the OFDM symbol which is cut from the downlink subframe is enough for generating the uplink-to-downlink switching time and the downlink-to-uplink switching time and tolerates some propagation delay. In other words, through cutting the downlink subframe by the length of the OFDM symbol, all subframes may be scheduled to a UE close to the base station. For a UE faraway from the base station, if the length of one OFDM symbol is not enough for avoiding the conflict between uplink and downlink transmissions, the base station may avoid to schedule this UE on such two adjacent downlink and uplink subframes at the same time. By this method, it may cause interference from downlink transmissions to uplink transmissions, or from uplink transmissions to downlink transmissions, however, other techniques may be adopted to reduce the impact, e.g., divide the subframes into sets according to interference levels. Or, shorten lengths of different numbers of OFDM symbols may be defined, and it is semi-statically configured that which shorten length is adopted through higher layer signaling, e.g., broadcast signaling, RRC signaling. For example, for a normal CP length, the number of OFDM symbols used for downlink transmission after being shortened may be 0~13.

It is supposed that the special subframe includes the UpPTS, similarly as the LTE TDD, the length of the UpPTS may be 1 or 2 OFDM symbols. In one method, besides the OFDM symbols used for the UpPTS, the downlink subframe is further shortened by one OFDM symbol. And similarly as the above method, conflict between receiving and transmission of the UE is avoided by scheduling of the base station. Or, shorten lengths of different numbers of OFDM symbols may be defined, and it is semi-statically configured that which shorten length is adopted through higher layer signaling, e.g., broadcast signaling, RRC signaling. For example, for a normal CP length, if the UpPTS occupies one OFDM symbol, the number of OFDM symbols used for downlink transmission after being shortened may be 0~12. If the UpPTS occupies two OFDM symbols, the number of OFDM symbols used for downlink transmission after being shortened may be 0~11.

For the flexible duplex cell, suppose that uplink resources are configured on both the FD-DL and the FD-UL, wherein the FD-DL may be dedicatedly used for transmitting SRS or used for transmitting SRS and other uplink signals. One processing method is as follows. Uplink transmission on the FD-DL and the uplink transmission on the FD-UL are put in one timing advance group (TAG). That is to say, the UE generally has established uplink synchronization on the FD-UL through PRACH. As such, the UE maintains a TA used for uplink transmission. This TA may be directly used for the uplink signal transmission on the FD-DL. Or, in another processing method, the uplink transmission on the FD-DL and the uplink transmission on the FD-UL may be processed as different TAGs. In other words, the UE establishes uplink synchronization on the FD-UL through the PRACH to maintain a TA for uplink transmission on the FD-UL. Meanwhile, the UE also has to establish uplink synchronization on the FD-DL on the PRACH to maintain a TA for uplink transmission on the FD-DL.

For a flexible duplex cell, if there is downlink transmission on the FD-UL, e.g., CRS, the UE may measure a path loss (PL) based on downlink signals on the FD-UL. Due to the channel symmetry on the same frequency, when used for uplink power control, the PL measured based on the downlink signals on the FD-UL is more accurate than that measured based on the downlink signals on the FD-DL. The present disclosure proposes to apply the PL measured based on the downlink signals on the FD-UL to the uplink power control, so as to have a better power control effect than existing LTE FDD system. For the situation that there is uplink transmission on both the FD-DL and the FD-UL, it is possible to respectively measure the PL based on the downlink signals on the carrier where the uplink signals are located, and applies the PL to power control of the uplink signals on the carrier of the UE.

In accordance with the above method, the present disclosure further provides an apparatus for processing flexible duplex. The structure is as shown in FIG. 4, the apparatus includes: a configuration module and a transmitting module; wherein The configuration module is to receive configuration information of flexible duplex; and The transmitting module is to transmit and received data according to an uplink and downlink subframe distribution on one or two carriers of a flexible duplex cell based on the received configuration information of the flexible duplex.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

The invention claimed is:

1. A method for processing data in a flexible duplex cell including a flexible duplex-uplink (FD-UL) carrier and flexible duplex-downlink (FD-DL) carrier, comprising:
   receiving, by a UE, configuration information of flexible duplex;
   measuring, by the UE, path loss (PL) based on downlink signals on the FD-UL carrier, and applying the PL to the uplink power control of the UE; and
   transmitting and receiving data, by the UE on the FD-UL carrier and the FD-DL carrier based on the received configuration information of flexible duplex and uplink and downlink subframe distribution of the flexible duplex cell,
   wherein:
      if required uplink subframe resources are less than or equal to downlink subframe resources, in one period, at least one subframe on the FD-UL carrier is downlink subframe, and all subframes on the FD-DL carrier are downlink subframes;
      if the required uplink subframe resources are more than the downlink subframe resources, in one period, all subframes on the FD-UL carrier are uplink subframes, and at least one subframe on the FD-DL carrier is uplink subframe; and for the FD-UL carrier and the FD-DL carrier of the flexible duplex cell, the FD-DL carrier is a carrier used for downlink transmission for a backward frequency division duplex (FDD) UE, and the FD-UL carrier is a carrier used for uplink transmission for the backward FDD UE.

2. The method of claim 1, wherein
the uplink and downlink subframe distribution of the flexible duplex cell is obtained through semi-static configuration; or
the uplink and downlink subframe distribution of the flexible duplex cell is obtained through re-configuration downlink control information (DCI).

3. The method of claim 2, wherein
the re-configuration DCI is transmitted on the FD-DL carrier.

4. The method of claim 2, wherein
if the flexible duplex cell is a secondary cell of the UE, the uplink and downlink subframe distribution of the flexible duplex cell is obtained in the re-configuration DCI of a primary cell of the UE.

5. The method of claim 2, wherein
the uplink and downlink subframe distribution on the FD-UL carrier is obtained based on the re-configuration DCI; or
the uplink and downlink subframe distribution on the FD-UL carrier and the uplink and downlink subframe distribution on the FD-DL carrier are obtained respectively from the re-configuration DCI; or
a joint indication indicating the uplink and downlink subframe distribution of the FD-UL carrier and the FD-DL carrier of the flexible duplex cell is obtained from an indication field of the re-configuration DCI.

6. The method of claim 1, wherein a periodicity of an uplink and downlink subframe pattern on the FD-UL carrier is T ms.

7. The method of claim 6, wherein the periodicity of an uplink and downlink subframe pattern on the FD-UL carrier is 10 ms, on one carrier among the FD-UL carrier and the FD-DL carrier, the number of uplink subframes allocated in one 10 ms period is a value between 0 and 10.

8. The method of claim 6, wherein the periodicity of an uplink and downlink subframe pattern on the FD-UL carrier is 8 ms, on one carrier among the FD-UL carrier and the FD-DL carrier, the number of uplink subframes allocated in one 8 ms period is a value between 0 and 8.

9. The method of claim 6, wherein the periodicity T of the uplink and downlink subframe pattern is 40 ms, and 40 bits are utilized to respectively indicate a duplex direction of each subframe in one period.

10. The method of claim 9, wherein if an index of an almost-blank subframe (ABSF) is n, subframe n+4 on the FD-UL carrier is configured as a downlink subframe.

11. The method of claim 6, further comprising:
for a downlink subframe on the FD-UL carrier, a hybrid automatic repeat request acknowledgement (HARQ-ACK) timing position of a downlink subframe on a same position of the FD-DL carrier as the downlink subframe on the FD-UL carrier is re-used for feeding back HARQ-ACK information.

12. The method of claim 6, further comprising:
obtaining cell-specific reference signal (CRS) structures of all possible downlink subframes on the FD-UL carrier according to bit mapping.

13. The method of claim 1, wherein a transmission power of a CRS resource element on the FD-UL carrier is the same as the FD-DL carrier.

14. The method of claim 1, wherein a timing advance of the UE is controlled by a base station, there is an interval between the base station receives an uplink subframe and transmits a downlink subframe, the interval is used for switching time from uplink to downlink.

15. The method of claim 1, wherein a downlink subframe includes an interval between downlink transmission time and uplink transmission time.

16. The method of claim 15, wherein the downlink subframe is shortened by a length of one orthogonal frequency division multiplexing (OFDM) symbol, and conflict between reception and transmission of the UE is avoided through scheduling of the base station; or a plurality of shortened lengths of different number of OFDM symbols are defined in advance, and the UE determines to adopt one shorten length of the downlink subframe among the plurality of shortened lengths according to a semi-static configuration of higher layer signaling.

17. The method of claim 1, wherein the uplink transmission on the FD-DL and the uplink transmission on the FD-UL are processed according to a same timing advance group (TAG); or the uplink transmission on the FD-DL and the uplink transmission on the FD-UL are processed according to different TAGs.

18. An apparatus for processing data in a flexible duplex cell including a flexible duplex-uplink (FD-UL) carrier and flexible duplex-downlink (FD-DL) carrier, the apparatus comprising:

a processor; and a transceiver, wherein the processor is configured to receive configuration information of flexible duplex, measure path loss (PL) based on downlink signals on the FD-UL carrier, and apply the PL to uplink power control, wherein the transceiver is configured to transmit and receive data on the FD-UL carrier and the FD-DL carrier based on uplink and downlink subframe distribution of the flexible duplex cell, wherein:

if required uplink subframe resources are less than or equal to downlink subframe resources, in one period, at least one subframe on the FD-UL carrier is downlink subframe, and all subframes on the FD-DL carrier are downlink subframes;

if the required uplink subframe resources are more than the downlink subframe resources, in one period, all subframes on the FD-UL carrier are uplink subframes, and at least one subframe on the FD-DL carrier is uplink subframe; and for the FD-UL carrier and the FD-DL carrier of the flexible duplex cell, the FD-DL carrier is a carrier used for downlink transmission for a backward frequency division duplex (FDD) UE, and the FD-UL carrier is a carrier used for uplink transmission for the backward FDD UE.

* * * * *